United States Patent [19]

Matyas et al.

[11] 4,229,818
[45] Oct. 21, 1980

[54] METHOD AND APPARATUS FOR ENCIPHERING BLOCKS WHICH SUCCEED SHORT BLOCKS IN A KEY-CONTROLLED BLOCK-CIPHER CRYPTOGRAPHIC SYSTEM

[75] Inventors: Stephen M. Matyas; Carl H. W. Meyer, both of Kingston; Louis B. Tuckerman, III, Briarcliff Manor, all of N.Y.

[73] Assignee: International Business Machines Corporation, Armonk, N.Y.

[21] Appl. No.: 974,596

[22] Filed: Dec. 29, 1978

[51] Int. Cl.$^3$ .............................................. H04L 9/02
[52] U.S. Cl. ........................................ 375/2; 364/200
[58] Field of Search ................................ 178/22; 375/2

[56] References Cited

U.S. PATENT DOCUMENTS

| | | | |
|---|---|---|---|
| 4,074,066 | 2/1978 | Ehrsam et al. | 178/22 |
| 4,078,152 | 3/1978 | Tuckerman | 178/22 |

Primary Examiner—Howard A. Birmiel
Attorney, Agent, or Firm—Roy R. Schlemmer, Jr.

[57] ABSTRACT

A method and apparatus for providing improved error-recovery and cryptographic strength when enciphering blocks which succeed short blocks in a Key-Controlled Block-Cipher Cryptographic System with chaining. Beginning with a pre-existing current chaining value (V), the system determines whether a current input block (X) of data to be encrypted is a full block or a short block. Both in the previous system and in proposed improvement, if the block is a full block, the system first combines the chaining value (V) with said full block (X) by a reversible operation such as exclusive-or and then block-enciphers the result of said exclusive-or under control of the user's cryptographic key (K) to produce an output cipher full block (Y); but if the block is a short block, of length $L_s$ then the system first block-enciphers the current chaining value (V) under control of the user's key (K), producing a result W, and then combines the short block (X), in a reversible operation, with the left-most portion, of length $L_s$, of W to produce an output cipher short block (Y), of length $L_s$. In either case, in the proposed improvement, the system then sets a new chaining value (V') for the system, as being equal to the terminal full block's length of the concatenation of the current chaining value (V) with the produced block of ciphertext (Y), and causes this new chaining value (V') to be the chaining value (V) for the next block. In the case of a short block this gives increased strength to, and speeded error-recovery for, the succeeding block or blocks to be enciphered, over the previous practice, in which the new chaining value was the last-previous output (W) of the block-cipher system.

10 Claims, 12 Drawing Figures

ENCIPHER - LENGTH NOT EQUAL 8 - SHORT OR FRACTIONAL BLOCKS

FIG. 1A
ENCIPHER—LENGTH EQUALS 8

FIG. 1B
DECIPHER—LENGTH EQUALS 8

FIG. 1C
ENCIPHER—LENGTH NOT EQUAL 8—SHORT OR FRACTIONAL BLOCKS

FIG. 1D
DECIPHER—LENGTH NOT EQUAL 8 — SHORT OR FRACTIONAL BLOCKS

METHOD AND APPARATUS FOR ENCIPHERING BLOCKS WHICH SUCCEED SHORT BLOCKS IN A KEY-CONTROLLED BLOCK-CIPHER CRYPTOGRAPHIC SYSTEM

DESCRIPTION

1. Technical Field

The present invention relates generally to the field of cryptography and more particularly to that area of cryptography known in the art as Key-Controlled Block-Cipher cryptographic systems.

Such Block-Cipher Cryptographic Systems are generally considered to be very secure. Assuming that the encipherment keys are known only to the sender and legitimate receivers of the message it is virtually impossible, utilizing known technology, for an opponent to break the more sophisticated systems, or stated differently, to obtain the encipherment/decipherment keys and thus decrypt the messages.

In an effort to effect a standard for government use which will aid government agencies in carrying out new Privacy Legislation, the National Bureau of Standards has recently adopted a Federal Information Processing Standard entitled, "Encryption Algorithm for Computer Data Protection". The standard together with a complete technical description is contained in the publication, "Data Encryption Standard," Federal Information Processing Standard (FIPS), Publication 46, National Bureau of Standards, U.S. Department of Commerce, January 1977. U.S. Pat. No. 3,958,081, more fully referenced in the subsequent section entitled Background Art discloses a hardware implementation of the standard.

A problem with such Block-Cipher Cryptographic Systems is that any given block of data X will be transformed into an output block Y, in such a way that, assuming that the same key is used, identical X's will produce identical Y's in the output. Although it is not generally agreed that this is a significant weakness on the part of the cryptographic algorithm, it has been found desirable to avoid this characteristic of the basic Block-Cipher Cryptographic Systems by utilizing various techniques of chaining one of which, stated briefly, entails the use of a preceding plaintext or ciphertext output to be introduced together with the new data being enciphered to cause an alteration in the output of the cryptographic operation. One such technique is set forth and described in U.S. Pat. No. 4,078,152 which is more specifically referenced in the subsequent Background Art section.

The chaining method set forth in U.S. Pat. No. 4,078,152 makes ciphertext blocks depend implicitly on preceding text for strength, frequently on much preceding text, but explicitly on very little ciphertext, for ease of decipherment and limited error-propagation. It achieves these results less than ideally in the special case of a block which succeeds one or many short blocks occurring in succession in a message to be enciphered. It is the intent of the present invention to provide a distinct improvement in the short block handling method of U.S. Pat. No. 4,078,152, wherein the security and error-recovery of blocks which succeed short blocks are substantially the same as those available to blocks which succeed full blocks. In general, a Block-Cipher Cryptographic System typically accepts plaintext blocks of a fixed length $L_f$ or $L^{(f)}$ (e.g. 8 bytes), called full blocks, and produces corresponding ciphertext blocks, typically of the same length. If short blocks, i.e. of various lengths $L_s$ or $L^{(s)}$ less than $L^{(f)}$, occur in the plaintext, some modified method is needed to encipher them, especially if the ciphertext is desired to be of the same length as the plaintext, i.e. without padding them out to full blocks. It is obviously desirable that such a method should have strength and error-recovery equal to that of the basic block-cipher method. In the chaining method set forth in U.S. Pat. No. 4,078,152, each block is enciphered with the assistance (in different ways, depending on whether the current block is a full block or a short block) of the next-preceding output W from the block-cipher device. That output W could either be a just-preceding full block of ciphertext, or the encipherment of the again just-preceding output, which had been used to help encipher a just-preceding short block. The decipherment was the appropriate inverse. This method has the advantages that the resulting ciphertext block usually depends implicitly on some or much of the preceding text (the amount depending on when the chaining process was last reinitialized) as well as on the key, which gives strength, and in all cases explicitly on only the key and a small amount of ciphertext, namely the current block of ciphertext and the nearest-preceding full block (if any) of ciphertext (otherwise on an initial chaining value). This explicit dependence allows easy decipherment (by a legitimate decipherer, who knows the key), for a fixed small memory requirement, and in most cases allows for self-healing, or limited error-propagation, of the ciphertext. Thus, any single error, in the computation or transmission of the ciphertext, can usually cause propagation of errors into the resulting deciphered plaintext by at most a fixed distance forward (e.g. by at most twice the full-block's-length $L^{(f)}$. However, this method has the following disadvantages. Firstly, whenever there is an initial sequence of short blocks, e.g. in successive short records, without any full blocks (unusual but possible), then the material which is used in combination with the plaintext to produce the ciphertext depends only on the key and the algorithm, not on the preceding text, so that two or more such ciphertext sequences produced under the same key could be attacked by known methods. (More generally, the same attack would be possible in the rather unlikely case of the same key being used to encipher two (or more) plaintexts which correspond identically to each other in the sequences of the lengths of their blocks, and which agree in the texts of their corresponding full blocks, but not necessarily in the texts of their short blocks.) Secondly, whenever there is a sequence of short blocks (whether or not there have been any preceding full blocks), the decipherment of the block (full or short) which succeeds each such short block depends explicitly, in part, on the last full block of ciphertext, which may be arbitrarily far in the past, so that the error propagation may not be limited.

It is accordingly, a primary object of the present invention to provide an improved method for enciphering/deciphering the blocks which succeed short blocks of data in a Key-Controlled Block-Cipher Encryption System of the type set forth and described in previously referenced U.S. Pat. No. 4,078,152.

It is another object of the invention to specifically utilize a new and different method of deriving the new chaining value for use with the encipherment algorithm on the succeeding block when a short block is encountered.

It is to be clearly understood that the present invention constitutes a specific and distinct improvement over the overall chaining method disclosed in U.S. Pat. No. 4,078,152 and it is to be further understood that the overall operation of the system of the present invention is identical to that of said patent, with the exception of the specific manner in which the new chaining value is generated during the encipherment/decipherment of a short block.

2. Background Art

The present invention constitutes a specific improvement over U.S. Pat. No. 4,078,152, entitled, "Block-Cipher Cryptographic System with Chaining," of L. B. Tuckerman, III, one of the co-inventors hereof. Specifically, it relates to a significant improvement in the chaining system used with and after short blocks of data. As will be apparent from the subsequent description the presently disclosed apparatus and method may be in effect substituted directly for a portion of the short block handling hardware in said U.S. Pat. No. 4,078,152.

For a general description of the operation of a typical block-cipher cryptographic system, per se, reference is hereby made to U.S. Pat. No. 4,798,359, entitled, "Block-Cipher Cryptographic System," U.S. Pat. No. 3,796,830, entitled, "Recirculating Block Cipher Cryptographic System;" and U.S. Pat. No. 3,958,081, entitled, "Block-Cipher System for Data Security," all assigned to the same assignee as the present application. These patents generally describe the concepts involved with current, highly sophisticated, Key-Controlled Block-Cipher Cryptographic Systems known in the art. The latter U.S. Pat. No. 3,958,081 relates to a very specific implementation of such a Block-Cipher Cryptographic system and more particularly, a cryptographic system which conforms to the Federal Information Processing Standard currently in effect.

By way of example we will suppose in the description of this invention that the block-cipher subsystem used in the aforementioned Data Encryption Standard (DES), in particular that the length of each block of text processed by the subsystem is 64 bits, for example 8 bytes of 8 bits each. It will be understood that this is merely by way of example, and other block-cipher subsystems, and other data-lengths, could be used.

BRIEF DESCRIPTION OF DRAWINGS

In the accompanying drawings forming a material part of this disclosure.

DISCLOSURE OF INVENTION

The present invention modifies the Key-Controlled Block-Cipher Cryptographic System with chaining mechanism disclosed in U.S. Pat. No. 4,078,152 by altering the part of the aforementioned patent which deals with the encipherment (or decipherment) of a short block $X_i$, so as to define a new and significantly different method of generating a "new" chaining value $V_i'$ to be used as a new "current" chaining value $V_{i+1}$ to assist in enciphering the immediately succeeding full or short block $X_{i+1}$.

According to the aforementioned patent, the new chaining value $V_i'$ generated as an additional consequence of the encipherment of a plaintext short block $X_i$ of length $L_i^{(s)}$ was in effect defined to be the same last full-block output $W_i$ of the block-cipher cryptographic system whose initial part, of length $L_i^{(s)}$, was reversibly combined (e.g. by an exclusive-OR) with $X_i$ to produce the ciphertext short block $Y_i$, of length $L_i^{(s)}$.

According to the present invention, the new chaining value $V_i'$ in the same circumstances is defined to be the final full-block's-length of the catenation $V_i \| Y_i$ of the old chaining value $V_i$ with the new ciphertext block $Y_i$, the latter being defined as in the aforementioned patent.

In the case of a plaintext full block $X_i$, the aforementioned patent defined the new chaining value $V_i'$ to be the new ciphertext full block $Y_i$.

In the present invention we do not change this definition of $V_i'$ for a full block $X_i$. However, this definition can be seen to be equivalent to defining $V_i'$ to be the final full-block's-length of the catenation $V_i \| Y_i$.

Hence in the aforementioned patent as modified by the present invention, the definition of the new chaining value $V_i'$, during encipherment of a block $X_i$ (full or short), can equivalently be taken to be the final full-block's-length of the catenation $V_i \| Y_i$ of the old chaining value $V_i$ with the just-produced ciphertext $Y_i$, regardless of whether $X_i$ (and hence $Y_i$) is a full block or a short block.

Furthermore, it can be seen under the above definition, that $V_i'$ can equivalently be defined to be the final full-block's-length of the catenation $V_1 \| Y_1 \| Y_2 \| \ldots \| Y_{i-1} \| Y_i = V_1 \| Y^{(i)}$ of the initial chaining value $V_1$, at the start of chaining, with the ciphertext $Y^{(i)} = Y_1 \| Y_2 \| \ldots \| Y_{i-1} \| Y_i$ produced so far. In fact, $V_i'$ can usually be taken to be the final full-block's-length of the ciphertext $Y^{(i)}$ produced so far, except in the case where the length $L^{(i)}$ of $Y^{(i)}$ is less than the length $L^{(f)}$ of a full block, in which case $V_i'$ consists of the catenation of the final $(L^{(f)} - L^{(i)})$-length portion of $V_1$, with $Y^{(i)}$. As an evident consequence, the decipherment of a current block of ciphertext depends explicitly on just that block, the just-preceding full-block's length of the ciphertext, and the key. Thus, the effect of an error in the ciphertext is limited to at most two full-block's-lengths of the deciphered plaintext.

To implement the above-described chaining procedure when a full-block's-length of ciphertext has not already been produced, the system regards the present ciphertext as preceded implicitly, if not in fact, by a full-block's-length of data $V_1 = K1$, either constant or variable, called the initial-chaining-value, which is known by agreement to both the encipherer and any legitimate decipherer. It should be noted that this initial chaining value is utilized essentially in the same fashion in the present system as in that of U.S. Pat. No. 4,078,152.

To achieve limited error propagation when enciphering a full-block, and to unify the procedures for both full and short blocks, the herein disclosed method utilizes as the full-block's-length of data, which is to be combined (e.g. XOR'd) with the full-block of plaintext before presentation to the block-cipher device, the same just preceding full-block's length of ciphertext. It should be noted that this is the same data as used for this purpose in U.S. Pat. No. 4,078,152, when the just-preceding plaintext block was a full block, but is different when the preceding plaintext block was a short block. Utilizing the present method, the propagation of an error in the ciphertext is limited to at most two block's-lengths of the deciphered plaintext.

To summarize the short block chaining method of the present invention, for both short and full blocks, a current chaining-value is always defined as the just-preceding full-block length $L^{(f)}$ of ciphertext. Such a chaining system requires that the first full-block's-length of text be preceded by an initial chaining value K1, which as stated above, must be a block of data agreed upon in advance by the system users. Provision of such an initial chaining value is thought to be obvious, however, it is also described in detail in said U.S. Pat. No. 4,078,152. If the current block of plaintext is a full block, it is combined by a reversible operation such as exclusive-ORing (XOR) with the current chaining-value, and the result is block-enciphered by the Key-Controlled Block-Cipher Cryptographic box included in the system. The result of this operation is the production of a full block of new ciphertext. However, if the current block of plaintext is a short block, i.e., of length $L^{(s)}$ less than $L^{(f)}$, then the current chaining-value is block enciphered by the encipherment device, and the result of this encipherment is combined by exclusive-ORing as much ($L^{(s)}$) of the result as necessary with the plaintext to get an equal length ($L^{(s)}$) of new ciphertext.

It is important to note that the usage of the expression chaining-value in U.S. Pat. No. 4,078,152, for example in column 8, line 62 et seq., is the same as in the present method, however, it is the derivation of the chaining-values which has been significantly changed in the present method. In said patent, the current chaining value used after n short blocks regardless of how many (n) were encountered in series was always (assuming that the chaining value had not been reinitialized, i.e., assuming record-chaining as defined in the aforementioned patent) the result of applying the block-cipher encipherment process n times to the nearest-preceding full-block Y of ciphertext since the last re-initialization, or to the initial chaining value K1 if there was no such full block, where the input to the block-cipher encipherment process on each of those n times after the first was the output of the preceding block-cipher encipherment process. However, in the present system the current chaining value is the last full-block's-length of ciphertext, (imagined to be preceded by the initial chaining value K1) regardless of whether it was derived from a full block or short block encipherment procedure. The ciphertext stream produced according to the present method would be the same as that of U.S. Pat. No. 4,078,152 if there were never more than one short block at the end of a record, and if there were no record-chaining. However, when there are two or more successive short blocks, with record-chaining, or when the short block is in the middle of a record, the ciphertext of the present system will vary markedly from that of the system of U.S. Pat. No. 4,078,152.

Formally, if the block-cipher operation is represented by f(K,), i.e. OUTPUT=f(K,INPUT), where K is the key, and if V is the current chaining-value, X the current plaintext block, Y the resulting ciphertext block, and V' the new chaining-value, then, with V starting from an agreed initial chaining-value, our improved method of defining successive Y and V' is:

if X is a short block, then $$Y = X \oplus LEFTLX(f(K,V))$$

$$V' = RIGHTFB(V \| Y);$$

if X is a full block, then
$$Y = f(K, X \oplus V)$$

$V' = Y (= RIGHTFB(V \mu Y)$; in this case V disappears)

where $\ominus$ denotes a reversible operation such as exclusive-OR, LEFTLX(...) means the left-most X-length portion of the string ..., $V \| Y$ means the catenation of the strings V and Y, and RIGHTFB(...) means the rightmost full-block's-lenght of the string ....

Figure 1A:
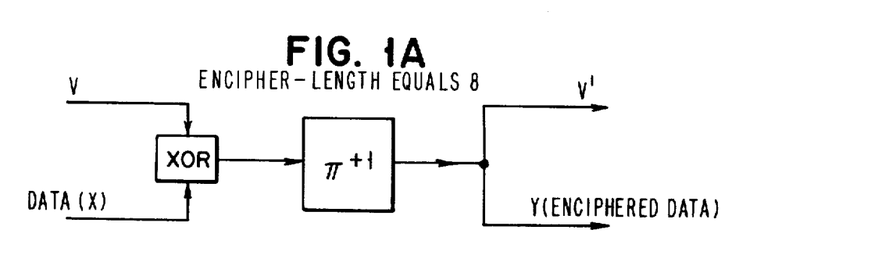
FIGS. 1A through 1E, comprise combination functional block and data flow diagrams in simplified form illustrating the operation of the present invention.
Figure 1B:
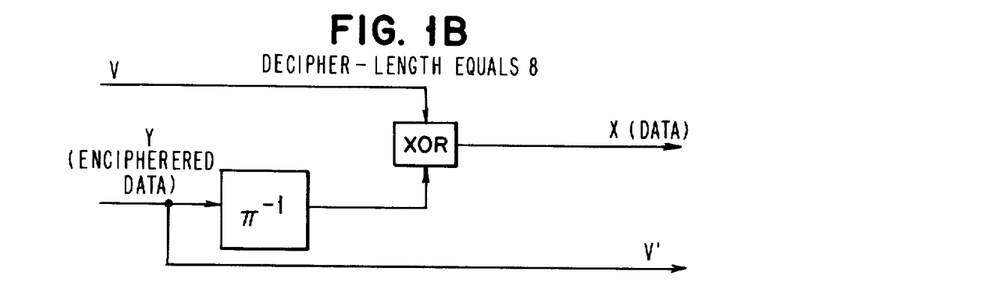

The above described chaining method may be more clearly understood from the following description of FIGS. 1A through 1D which constitute a series of very high level functional block/data flow diagrams illustrating the principles of operation of the invention. FIGS. 1A and 1B represent the data flow and functional operations encountered in a normal full block situation, i.e., a block containing $L^{(f)} = 8$ bytes. In all of these figures the reference to $\pi^{\pm 1}$ implies a key-controlled block-cipher system such as the subject of the aforementioned National Bureau of Standards FIPS Data Encryption System, with a superscript +1 for encipherment and a −1 for decipherment. Such terminology is also utilized and specifically defined in U.S. Pat. No. 4,078,152 wherein the same symbols are used. All that is required by the embodiment of said system which is represented in said patent and in the present description is that a block of data to be enciphered or deciphered be presented to the $\pi$ block I/O register 50 such as in FIG. 3B, as well as a particular key and suitable control signals. The result appears in the same register 50. FIGS. 1A and 1B are circuit flow diagrams showing the encipherment and decipherment of a full block, in exactly the same way as described in U.S. Pat. No. 4,078,152. In FIG. 1A a full block of plaintext to be enciphered is passed into the exclusive-OR box together with the current chaining value V. The exclusive-OR box (XOR) operates as expected. The output passes through the $\pi^{+1}$ box and the result of this is the ciphertext block Y which is also the new chaining value V' for that operation, and which becomes the current chaining value V for the next block of data.

In FIG. 1B this process is functionally reversed for decipherment as will be apparent. Thus, in the decipherment operation the full block of ciphertext passes into the $\pi^{31\ 1}$ block for decipherment and at the same time becomes the chaining value V' for the next sequential block of data to be deciphered. The output of the $\pi^{-1}$ box becomes one input to the exclusive-OR circuit, the other input to which is the current chaining value V. The output of the exclusive-OR box is the full deciphered plaintext block X.

Figure 1C:
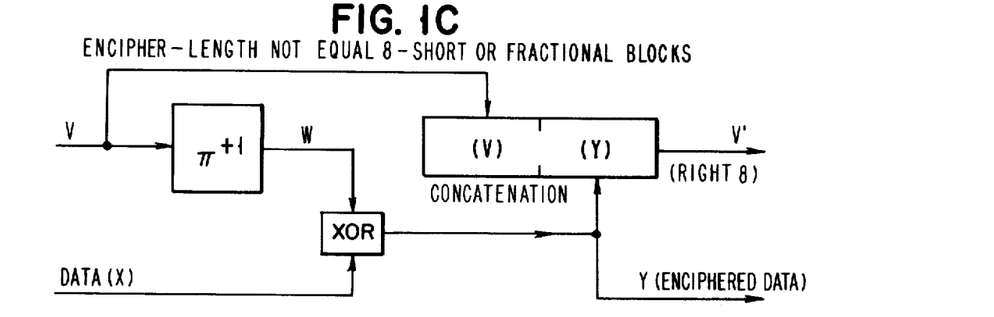
Figure 1D:
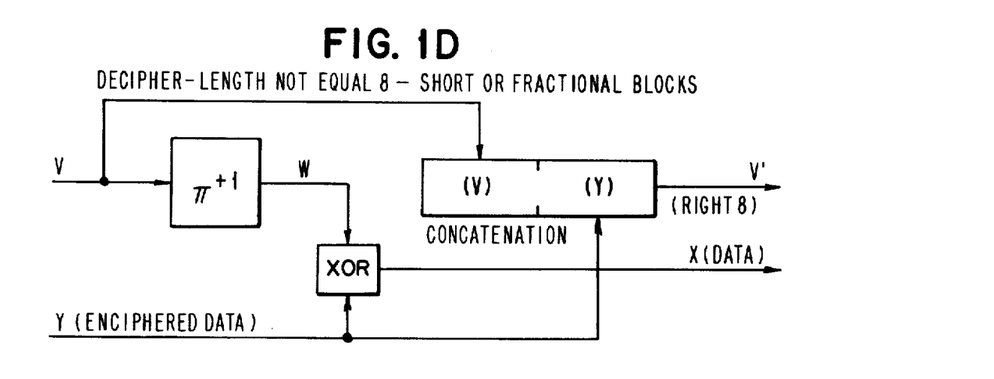

In FIG. 1C the short block chaining system of the present invention is described for encipherment and in FIG. 1D for decipherment. As will be apparent, the decipherment is the mathematical inverse of the encipherment. It should be noted that in the description of FIGS. 1C, 1D and 1E, the lengths of each X and the corresponding Y are equal and less than that of a full block, i.e. less than 8 bytes. The superscript (s) is not utilized in this description as it is thought to be confusing here.

Referring to FIG. 1C, the current chaining value V is applied first to the $\pi^{+1}$ box for encipherment, and also placed in, or resident in, a concatenation register. The plaintext block X is exclusive-ORed with the output W of the $\pi$ box to produce the ciphertext block Y. The short block of enciphered data Y is also shifted into the concatenation register, and from this register the rightmost full-block's-length may be gated out and become the new chaining value V'. For this procedure, however, it is sufficient and equivalent, that the capacity of the concatenation register be a full-block's-length, and that as the new ciphertext block Y is shifted into it, an equal number of the left-most, i.e., oldest bytes of V are shifted out of it and lost. The contents of the concatenation register will then be the new chaining value V'. It should be noted that the new value V' will always contain all of the bytes of Y which were produced, and as many of the right-most bytes of the previous current chaining value V as are necessary to make up a full-block's-length. This new current chaining value is utilized in the next subsequent operation, regardless of whether the next encountered block is a full block or an additional short block. The case of additional short blocks occurring in sequence is shown clearly in FIG. 1E which will be explained subsequently.

Referring to FIG. 1D the decipherment mode of operation is the mathematical inverse of the encipherment mode shown in FIG. 1C.

Notice that in both FIGS. 1C and 1D, the blockcipher $\pi$ is used in encipherment mode.

The chief difference between FIGS. 1C and 1D is that the roles of the plaintext short block X and the corresponding ciphertext short block Y are interchanged with respect to input and output, since the operation of exclusive-OR is its own inverse. Thus the effect of the XOR in FIG. 1C is Y=X XOR W, where W is the output of the $\pi$ box, or more precisely, an initial portion of it of length equal to that of X; and the effect of the XOR in FIG. 1D is X=Y XOR W=Y XOR$^{-1}$ W, which is the inverse of the effect in FIG. 1C, and thus produces the deciphered plaintext short block X. If some other opertion than XOR is used for the encipherment of a short block X, say Y=X $\triangle$ W, where the operation $\triangle$ has a right-inverse $\triangle$, then the operation X=Y $\triangle$ W must be used for the decipherment of Y. Note that in both the encipherment and decipherment of a short block there is an encipherment operation performed by the block-cipher cryptographic system, as was also the case for short blocks in the aforementioned patent. This is necessary in order to ensure that the same quantity W is made available for decipherment as for encipherment. In the decipherment mode it will be noted that the concatenation register receives as its two inputs the current chaining value V and the current ciphertext block Y which are concatenated as described with respect to FIG. 1C to produce the new chaining value V'.

Notice that if X and Y are corresponding plaintext and ciphertext short blocks, then the identical new chaining value V' is produced during encipherment of X, given V. This is necessary for the successful decipherment of subsequent blocks.

Figure 1E:
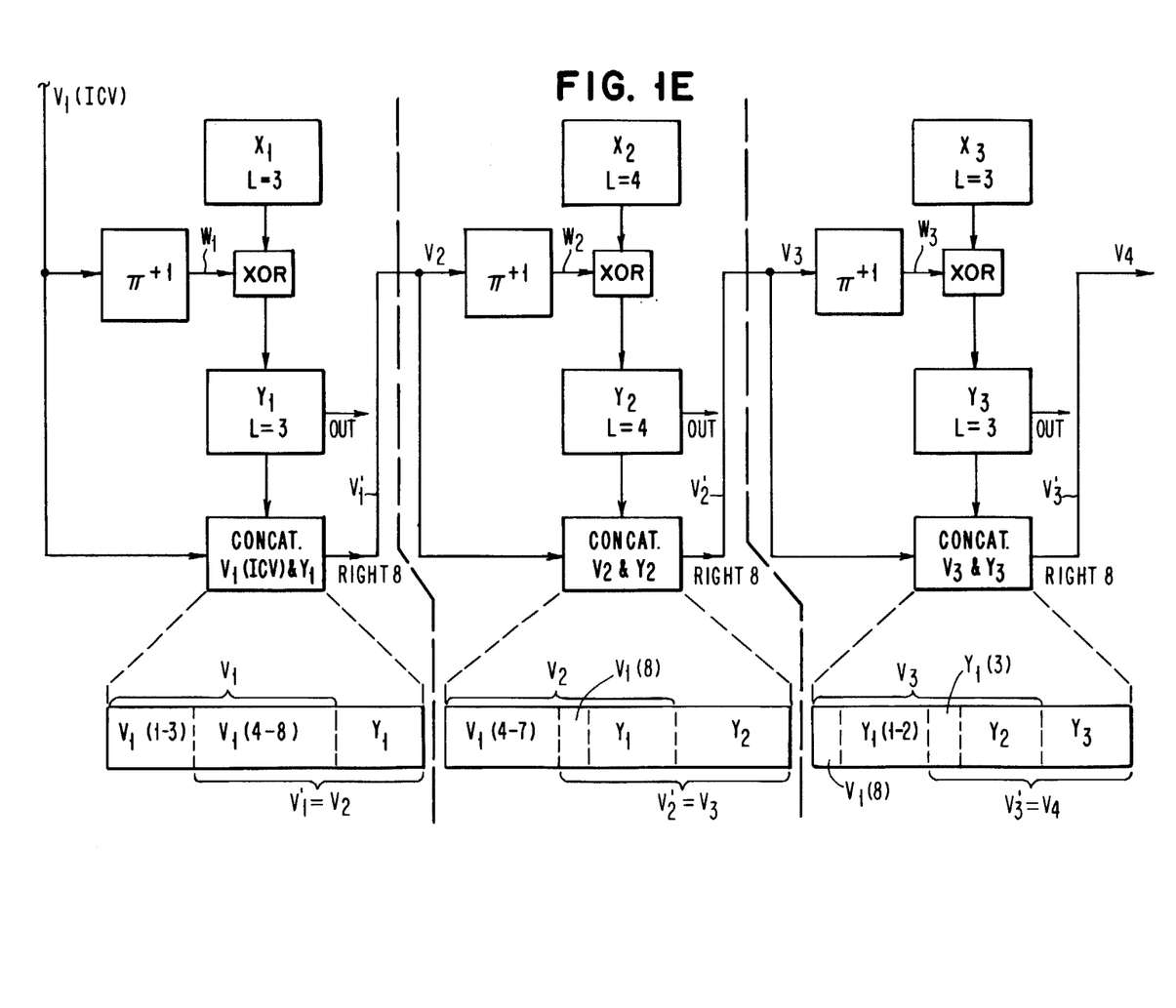

Referring now to FIG. 1E, there is shown an example of the encipherment of the three consecutive short blocks labeled $X_1$, $X_2$ and $X_3$ occurring in sequence in a data stream presented to the system for encipherment. It is assumed that there is appropriately stored in the concatenation register a current chaining value $V_1$ which can alternatively be an Initial Chaining Value (ICV) if these short blocks are the first data blocks of a new message or file (or record, in the case of no record-chaining) being enciphered by the system. The three separate operations are separated by the two vertical dotted lines, and each of these sections repeats the hardware and the data flow illustrated in FIG. 1C. It will first be noted that the input short blocks $X_1$, $X_2$ and $X_3$ are indicated as having lengths of 3 bytes, 4 bytes and 3 bytes respectively (L=3, L=4 and L=3).

In the three stages it will noted that the inputs to the $\pi$ blocks are the three current chaining values $V_1$, $V_2$ and $V_3$. The respective outputs $W_1$, $W_2$ and $W_3$ from the $\pi$ block are exclusive-ORed in the XOR boxes with the three plaintext blocks $X_1$, $X_2$ and $X_3$ to produce the three ciphertext blocks $Y_1$, $Y_2$ and $Y_3$. It will of course be noted that only as many of the bytes of the outputs of the respective $\pi$ blocks are utilized in the XORs as are needed to produce output ciphertexts of the same lengths as the input texts. Thus, in stage 1, $Y_1$ has a length of 3 bytes.

At this point, consider the generation of the new chaining value in each of the stages. In stage 1, $Y_1$ is concatenated with the current chaining vaue $V_1$ as shown in the expanded virtual register contents at the bottom of this stage. The concatentation produces a new chaining value $V_1'$ of 8 bytes which comprises the three bytes of $Y_1$ at the right, and the five rightmost bytes of $V_1$ at the left. $V_1'$ as is apparent from the drawing becomes the new current chaining value $V_2$ for stage 2. As noted earlier, the concatenation register in fact only needs to equal a full-block in length; the portion of its apparent contents which are not included in the new chaining value $V_1'$ may be shifted out and lost as the ciphertext $Y_1$ is shifted in.

Similarly, the new current chaining value $V_2$ in addition to being fed into the $\pi$ box is also gated into (or retained in) the concatenation register, which then also receives the new ciphertext short block $Y_2$ consisting of 4 bytes. This is shown at the bottom of the second stage. Thus, the new chaining value $V_2'$ will comprise the 4 bytes of $Y_2$ and the four rightmost bytes of $V_2$, the latter four bytes themselves comprising the 3 bytes of $Y_1$ and one byte of the chaining value $V_1$.

In the third stage, the new current chaining value $V_3$ is gated into the $\pi$ block and also into the concatenation register where it is then combined with the new ciphertext short block $Y_3$. The new chaining value $V_3'$ comprises the three bytes of $Y_3$ and the rightmost five bytes of $V_3$. At this point, the new chaining value $V_3'$ which becomes the current chaining value $V_4$ for the next operation is now comprised completely of ciphertext. These are the three bytes of $Y_3$, the 4 bytes of $Y_2$, and the rightmost byte of $Y_1$. It may be clearly seen that the chaining value is continually changing regardless of how many short blocks are in sequence. It will also be noted that if the fourth data block (which is not shown) were a full block length, i.e., L=8, the new current chaining value $V_4$ would be utilized in the conventional full block encryption operation in the same manner as described in FIG. 1A.

BEST MODE FOR CARRYING OUT THE INVENTION

Figures 2, 2A:
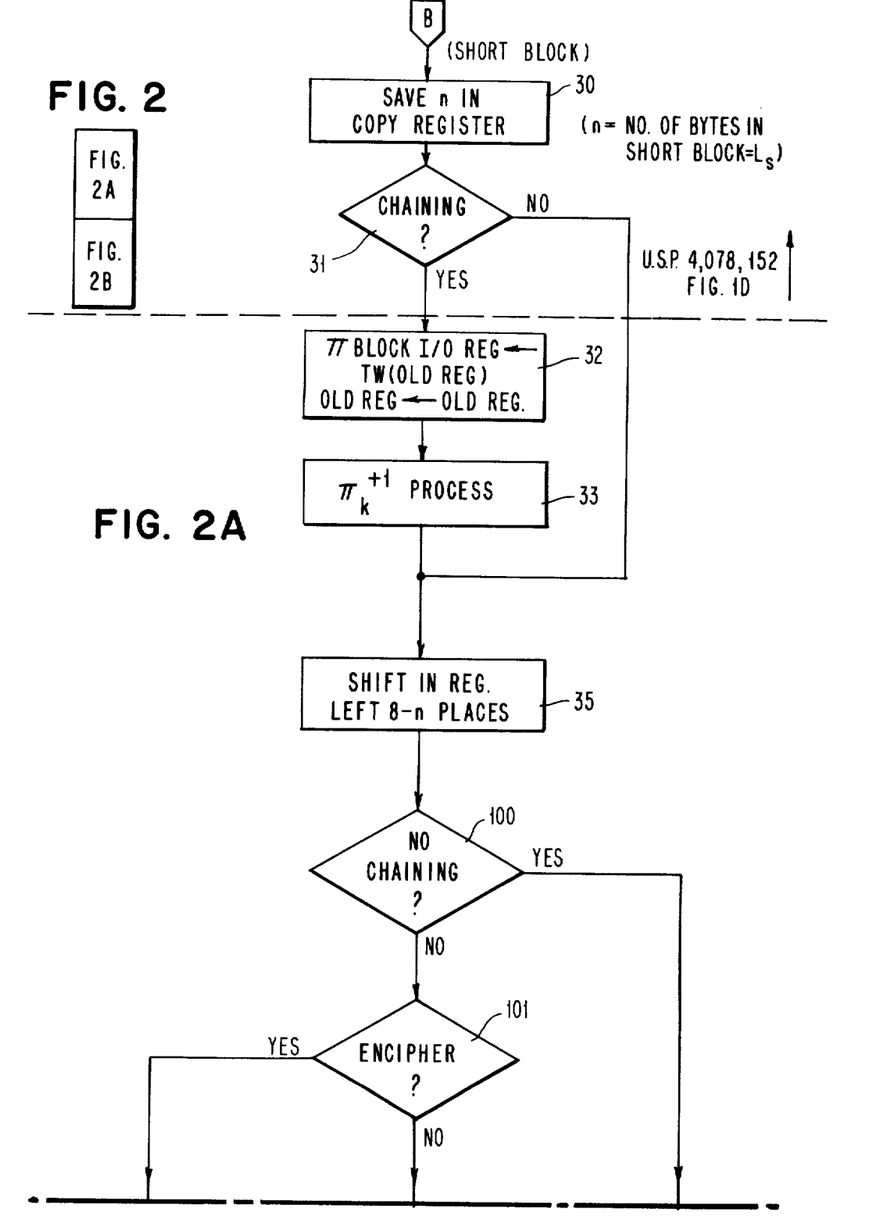
FIG. 2 is an organizational drawing for FIGS. 2A and 2B.
FIGS. 2A and 2B comprise a flow diagram of the operation of the present invention.
Figure 2B:
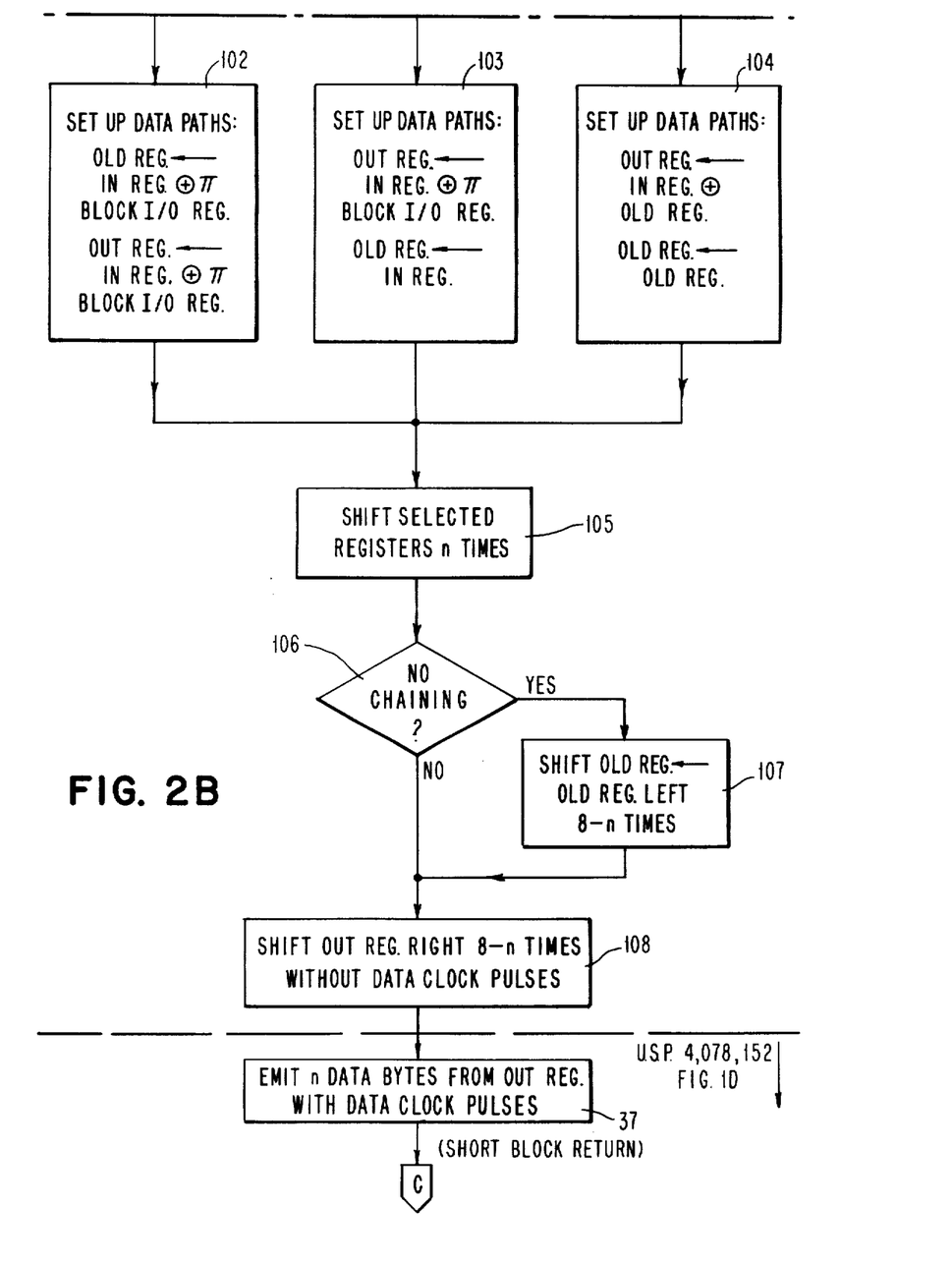

Having generally decribed the operating concepts of the present improved short block chaining method, there will now follow a description of the disclosed specific hardware embodiment suitable for practicing the invention. FIGS. 2A and 2B comprise a functional flow diagram of the operations required of the hardware embodiment set forth in FIGS. 3A through 3C. Before preceeding with this description, the present invention will be placed clearly in perspective with the system set forth and described in U.S. Pat. No. 4,078,152. It is again reiterated that the present short block chaining method constitutes an improvement over the short block chaining method set forth in said aforementioned patent. Consequently the entire system operates in exactly the same way as with U.S. Pat. No. 4,078,152 until a short block is encountered. At this point, the present modified hardware and controls take over the operation of the basic system. Referring to FIG. 1D of U.S. Pat. No. 4,078,152, the flow chart described in FIGS. 2A and 2B of the present invention exactly replace the flow chart of said FIG. 1D. Note that among other hardware, that patent and the present invention include three registers: box 10, named IN Register, to contain input data; box 12, named OLD Register, to contain the chaining value; and box 14, named OUT Register, to contain data for output. The system operates in exactly the same way up through box 35 with the exception that box 34 is now eliminated; blocks 100–108 replace old box 36, and upon leaving box 108 of the present system, box 37 of the aforementioned patent is reentered and the system continues to operate in the same manner as before. The specific hardware additions to the embodiment shown in FIGS. 3A, 3B and 3C herein with respect to the same FIGS. in U.S. Pat. No. 4,078,152 are the addition of the exclusive-OR circuit XOR3 in FIG. 3A together with the appropriate cabling to feed this exclusive-OR circuit, and additional input and control facilities for multiplexers MPX2 and MPX3. One data input to XOR3 comes from the IN Register and the other from the π block I/O REG. The output from XOR3 is fed to MPX2 as a new input number four, and to MPX3 as a new input number two. An additional control line must therefore be added to the control lines for each of MPX2 and MPX3.

Accordingly, in the short block chaining method of the present system the exclusive-ORing function of a short data block X or Y with the block-cipher encipherment W of the current chaining value V is performed in XOR3 rather than in XOR2 as in U.S. Pat. No. 4,078,152, in order that, in the case of encipherment the output of XOR3, which is the ciphertext short block Y, may also be directed via MPX2 into the OLD Register, to form part of the new chaining value V'. The OLD Register is used both as the Concatenation Register described earlier, and to contain the resulting new chaining value, which then becomes the new current chaining value. Since only the final full-block's-length of the result of the concatenation is saved as V', it is sufficient that the length of the OLD Register is a full-block's-length, any excess initial bytes being dropped.

Figures 3, 3C:
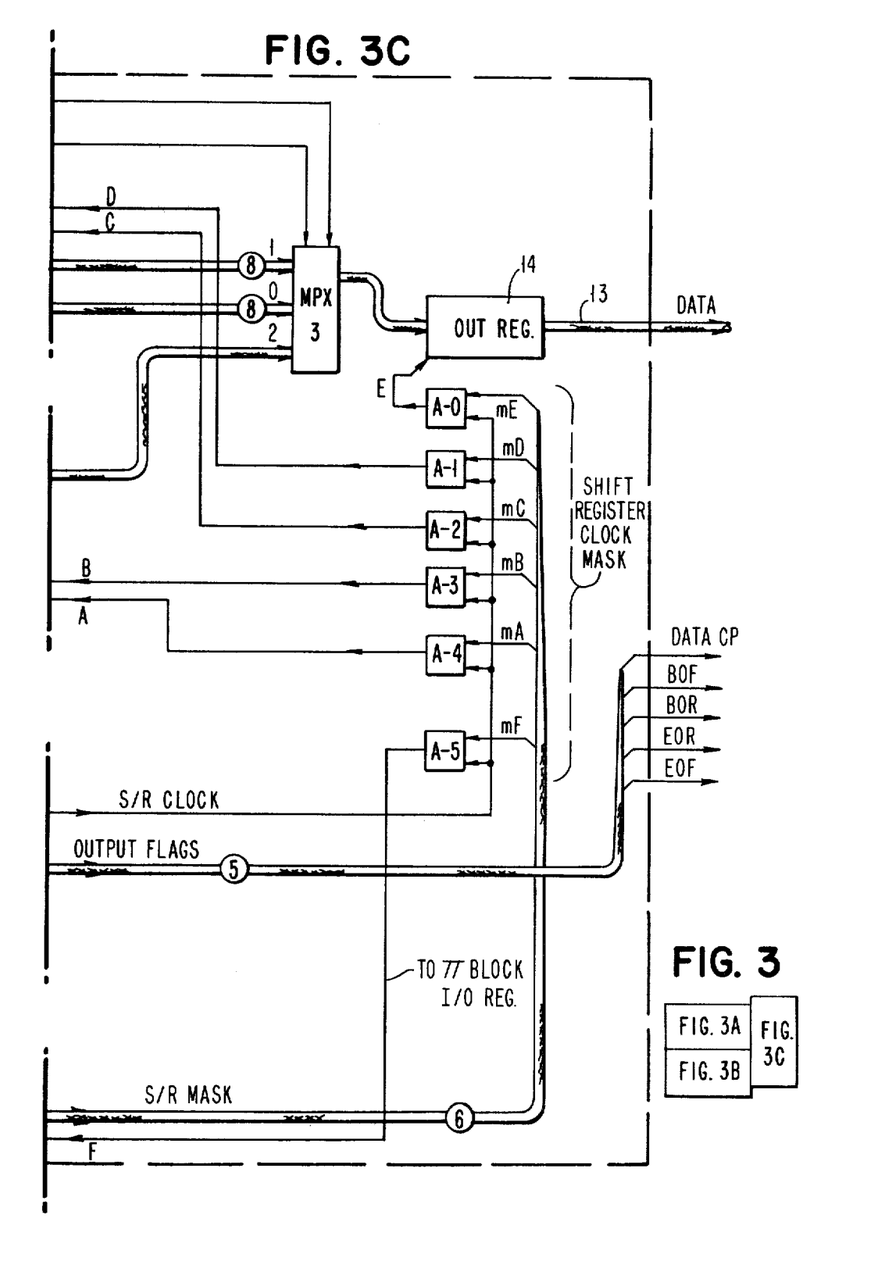
FIG. 3 is an organizational drawing of FIGS. 3A through 3C.
FIGS. 3A through 3C comprise a combination functional block and logical schematic diagram of a preferred embodiment of the present cryptographic system with unique short block handling techniques.
Figure 3A:
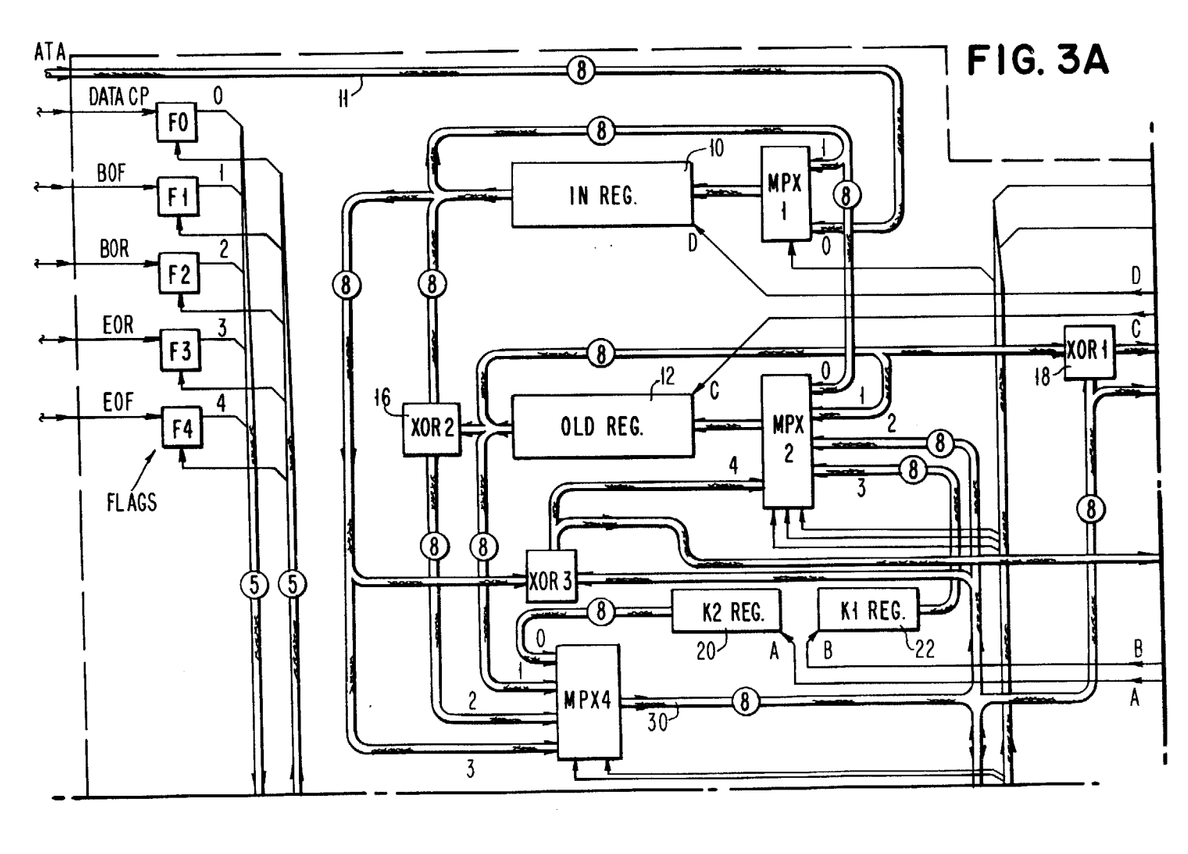
Figure 3B:
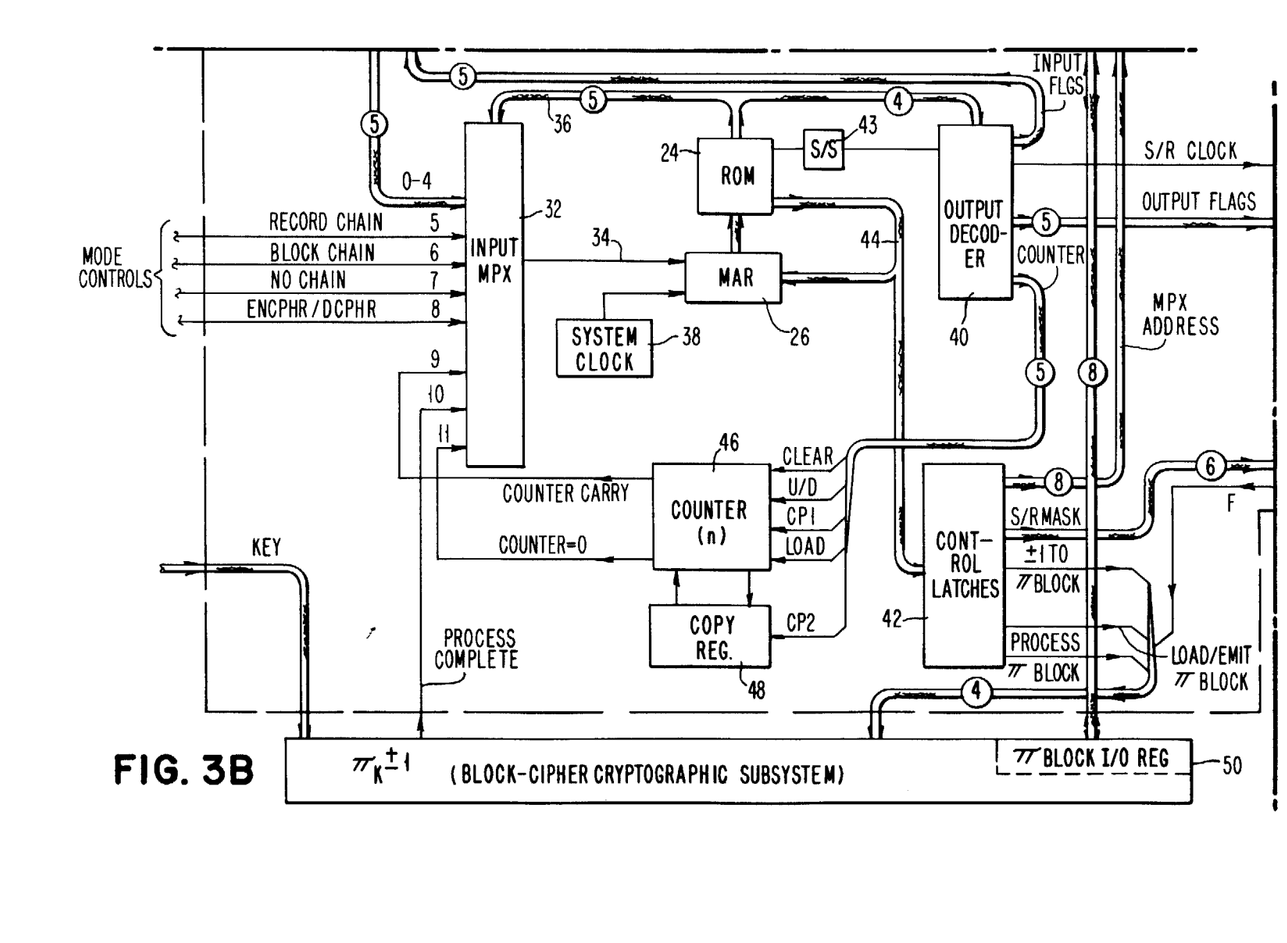

The hardware set forth in FIGS. 3A through 3C of the present system operates in an identical fashion to that of U.S. Pat. No. 4,078,152 except as noted herein. The description of the operation of the system disclosed in U.S. Pat. No. 4,078,152 is hereby incorporated by reference in the present specification. Specific reference is made to the description in said patent beginning in column 18 of the hardware embodiment and to the description beginning in column 26 of the microprogram sequence list with reference to the hardware. In said descriptions, the operation of the various registers, multiplexors and exclusive-OR circuits located in the data handling section, and the operation of the control sections are specifically described. The present microprogram sequences would similarly be stored in ROM 24 to form the requisite shifting, gating, testing, branching, etc. functions required thereof in exactly the same way as for the aforementioned patent. Similarly the Output Decoder 40, the Control Latches 42, Input MPX 32 and the ROM 24 and its associated MAR 26 function in an identical manner to that in U.S. Pat. No. 4,078,152.

The description of the present embodiment will now begin, it being assumed that a short block has been detected in box 28 of the flow chart of FIG. 1B in U.S. Pat. 4,078,152. At this point a short block (plaintext or ciphertext) exists in the IN Register. The number of bytes n contained in such a short block is currently stored in the Counter 46. It is accordingly assumed that the system has now branched to box 30 of the flow chart shown in FIG. 2A of the present disclosure. In this box the value of n representing the current setting of the counter is stored in the Copy Register 48. The system then proceeds to box 31 where a determination as to whether or not chaining is being used is made. Assuming that chaining, as intended in this invention, is specified, control passes to boxes 32 and 33, which together cause the contents of the OLD Register, which contains the current chaining value V, to both be cryptographically transformed by the π block into W in the π Block I/O Register, and also be retained in the OLD Register.

The operation TW indicated in box 32 is an optional addition to chaining which is described in the aforementioned U.S. Pat. No. 4,078,152 in column 14, line 45, and elsewhere. It would be included or not in the practice of the present invention accordingly as it was or was not used in the parts of said patent which are not being altered. (Note that box 34 of the former patent (U.S. Pat. No. 4,078,152) has been eliminated. The system then proceeds to box 35 where the n input bytes are shifted left 8-n places. This left-justifies or left-adjusts the bytes in the IN Register. It will be remembered that the registers of the present system are all serial-by-byte organized.

The system then proceeds to box 100, which is the first of the boxes which replaces box 36 of FIG. 1D of U.S. Pat. No. 4,078,152. In box 100 the "no chain" mode control line 7 is tested to determine whether chaining is requested.

Assuming, as we do, that chaining is specified, the system will proceed to box 101, and a decision is made as to whether the system is in an encipherment or a decipherment mode.

Assuming that it is in encipherment mode, the system will proceed to box 102. In this box the data paths are set up, and in box 105 the n shifts are carried out, by which the plaintext short block X stored in the IN Register will be exclusive-ORed with the initial part of the block-cipher encipherment W, contained in the π block I/O register, of the current chaining value V', and concurrently the result of this exclusive-ORing, which constitutes the resulting ciphertext short block Y, will be gated both into the OLD Register, to constitute part of the new chaining value V', and into the OUT Register. The just-described flow and processing of data has also been shown in FIG. 1C. In box 106 a test and decision are again made as to whether chaining has been specified. Since under the present assumptions it has been, control goes to box 108, where the OUT Register is shited 8-n times to right-justify the short block Y in it, and then to box 37, at which the n bytes of Y are emitted, and at which the flow of control described in the aforementioned patent has resumed.

Returning now to box 101, suppose that decipherment has been specified. Control then passes to box 103. In this box the data paths are set up, and in box 105 the n shifts are carried out, by which the ciphertext short block Y stored in the IN Register will b exclusive-ORed with the initial part of the block-cipher encipherment W, contained in the π block I/O register, of the current chaining value V; and the result of this exclusive-ORing will be gated into the OUT Register, and concurrently the IN Register, containing Y, will also be gated into the OLD Register to form part of the new chaining value V'. The just-described flow and processing have also been shown in FIG. 1D. The subsequent flow of control is then through the same boxes 106, 108, and 37, as previously described for encipherment under short-block chaining.

Returning now to box 100, we consider (with a short block) that "no chaining" has been specified. This is a means of optionally bypassing the chaining features of the afore mentioned patent and of the present improvement. Control then passes to box 104. In this box the data paths are set up, and in box 105 the n shifts are carried out, by which the plaintext or ciphertext block X or Y stored in the IN Register will be exclusive-ORed with the initial part of the contents of the OLD Register, which contains the block-cipher encipherment of an initial value K2, said encipherment having been placed there during the execution of boxes 5, 7, 8 and 9 of FIG. 1A of the aforementioned patent; the result of the exclusive-ORing being gated into the OUT Register, and concurrently the contents of the OLD Register being gated back into the OLD Register. In box 106 a test is made for chaining, and in this case control passes to box 107. In box 107, the OLD Register is shifted an additional 8-n bytes, restoring it to the contents it had before block 104, in preparation for processing any additional short blocks. Control then passes to blocks 108 and 37, where the short block Y or X is read out, and flow continues to point C in FIG. 1A of the aforementioned patent.

Having described the overall system flow diagram of FIGS. 2A and 2B there will now follow a brief description of the actual hardware operations required of the system. FIGS. 3A, 3B and 3C contain all of the requisite hardware for performing the required operations, it being noted that these operations will be decribed utilizing the microprogram sequence list which immediately follows this description. It will be noted that the Microprogram Sequence List is tied in by parenthetical numbers to the left of the list which correspond to the numbered boxes in the flow charts of FIGS. 2A and 2B. It will be further noted that each of the numbered sequences in the Microprogram Sequence List will be carried out by one or more micro instructions stored in the ROM 24. The operation of the Control Unit including the ROM 24, the Output Decoder 40, the Control Latches 42, the Input MPX 32 and the other associated control hardware were described in detail in U.S. Pat. No. 4,078,152. Only as much as the hardware in FIGS. 3A, 3B and 3C will be specifically described herein as is necessary to effect the presently disclosed improved short block chaining method.

| | MICROPROGRAM SEQUENCE LIST |
|---|---|
| (100) | ADDRESS IMPX LINE 7<br>TEST IMPX<br>IF 1 GO TO (104)<br>IF 0 CONTINUE |
| (101) | ADDRESS IMPX LINE 8<br>TEST IMPX<br>IF 0 GO TO (103)<br>IF 1 CONTINUE |
| (102) | ADDRESS MPX3 CABLE 2<br>ADDRESS MPX2 CABLE 4<br>SET S/R MASK TO 001111<br>GO TO (105A) |
| (103) | ADDRESS MPX3 CABLE 2<br>ADDRESS MPX2 CABLE 0<br>SET S/R MASK 001111<br>GO TO (105A) |
| (104) | ADDRESS MPX4 CABLE 1<br>ADDRESS MPX3 CABLE 2<br>ADDRESS MPX2 CABLE 1<br>SET S/R MASK TO 001110 |
| (105A) | LOAD COUNTER 46<br>SET U/D LINE TO 0<br>ADDRESS IMPX LINE 11 |
| (105B) | EMIT S/R CLOCK PULSE<br>DECREMENT COUNTER 46<br>TEST IMPX<br>IF 0 GO TO (105B)<br>IF 1 CONTINUE |
| (106) | ADDRESS IMPX LINE 7<br>TEST IMPX<br>IF 0 GO TO (108A)<br>IF 1 CONTINUE |
| (107A) | ADDRESS MPX2 CABLE 1<br>SET S/R mask to 001000 (mC selects OLD REG)<br>ADDRESS IMPX LINE 9<br>LOAD COUNTER 46<br>SET U/D LINE TO 1 |
| (107B) | EMIT S/R CLOCK PULSE<br>INCREMENT COUNTER 46<br>TEST IMPX<br>IF 0 GO TO (107B)<br>IF 1 CONTINUE |
| (108A) | SET S/R MASK TO 000010<br>mE SELECTS OUT REG)<br>ADDRESS IMPX LINE 9<br>LOAD COUNTER 46<br>SET U/D LINE TO 1 |
| (108B) | EMIT S/R CLOCK PULSE<br>INCREMENT COUNTER 46<br>TEXT IMPX<br>IF 0 GO TO (108B)<br>IF 1 GO TO (37A) |

Corresponding to the earlier description of FIG. 2, flow of control passes from sequence (35) of the microprogram in column 25 of U.S. Pat. No. 4,078,152 to sequence (100) of the microprogram in the present description. At this point the IN Register contains the new short block X or Y to be enciphered or deciphered, the OLD Register contains the current chaining value V, and the π block I/O Register currently contains the encipherment W of the current chaining value V.

The sequence (100) first causes the Input MPX 32 to address line 7. This line is the "no chain" line, which is preset when initializing the system. If the "no chain" mode of operation is indicated a "1" will appear on the line 34 as a result of the implicit test in the multiplexor 32. Line 34 being set to a "1" causes a branch address stored in the MAR 26 to be gated into the ROM 24, which in turn causes the system to branch to sequence (104). If line 34 is at a "0", indicating a chaining mode of operation, the system will continue to the next sequence in the ROM by, in effect, incrementing the old address currently in the MAR 26. Assuming the system proceeds to sequence (101), this sequence first causes IMPX 32 to address line 8 to determine if an encipherment or decipherment operation has been specified. Similarly to sequence (100), the TEST IMPX function directs the signal on line 8 to output line 34. If line 34 is thus set to a "1", this implies that a decipherment operation is called for and the system branches to sequence (103) by the branching operation described above. If, on the other hand, line 34 is set to a "1", it implies that encipherment is called for, no branch is required, and the system continues to sequence (102).

In sequence (102) the accessed microinstruction in the ROM causes the output from the Control Latches 42 to select cable 2 in MPX 3 and cable 4 in MPX 2. The sequence also sets the S/R Mask emanating from the Control Latches 42 on the mask cable to a 001111 configuration. This provides a continuous input to the lines mC, mD, mE and mF appearing as inputs to four of the six AND gates A-0 to A-5 directly below the OUT Register on FIG. 3C. This directs subsequent pulses on the S/R Clock line to lines C, D, E and F, and thus in effect sets up the shifting operation for the OLD Register, the IN Register, the OUT Register, and the $\pi$ Block I/O Register, respectively. The completion of this sequence causes the system to proceed to sequence (105A).

Had the system branched to sequence (103) after sequence (101) an operation similar to (102) would have occurred wherein the upper cable from the Control Latches 42 would have caused cable 2 of MPX 3 and cable 0 of MPX 2 to be selected. The S/R Mask Cable is set to the pattern 001111 which is, as will be noted, the same as in sequence (102). Thus, the same registers will receive shift control pulses for the operations specified in boxes 102 and 103 of the flow diagram. In both cases, the OUT Register receives the exclusive-OR output of the contents of the IN Register and the $\pi$ Block I/O Register. However, in box 102 OLD Register receives the same input as the OUT Register, whereas, in box 103, because of the different cable of MPX2 which was selected, the OLD Register receives the contents of the IN Register as is required of a decipherment operation since OLD Register is being prepared to receive a contribution Y to the new chaining value V'. At the end of sequence 103 the system branches to sequence (105A).

Assuming at this time that the test made in sequence (100) caused the system to branch to sequence (104), implying "no chaining", the first instruction of this sequence causes the output cable from the Control Latches 42 to address MPX 4 cable 1, MPX 3 cable 2 and MPX 2 cable 1. The selections for MPX 4 and MPX 3 set up the data flow paths for the contents of IN Register to be exclusive-ORed with those of OLD Register, which was previously loaded with the encipherment of a value which is stored in the K2 Register as explained in U.S. Pat. No. 4,078,152, and for the result of the exclusive-OR to be read into the OUT Register. The selection of MPX2 sets up the paths for the contents of the OLD Register to be returned to the OLD Register. Sequence (104) also causes the S/R Mask cable to be set to 001110 which causes the OLD Register, the IN Register, and the OUT Register to receive shift pulses during the operational sequence (105).

Sequence (105) is broken into section A and Section B. Sequence (105A) in effect sets up the control lines for the sequence and sequence (105B) is a control loop which allows the successive shifting of bytes within the specified registers, and tests the contents of the counter 46 to see if the required number of shifts have yet occurred. Thus, (105A) causes the Counter 46 to be loaded with the count n which was previously stored in the Copy Register 48; it also sets the counter control line U/D to a "0" which will cause each pulse CP1 to decrement the counter; and it selects IMPX line 11 to allow the control sequence in the ROM 24 to test when the counter contents have reached 0. The completion of sequence (105A) causes sequence (105B) to begin. This sequence causes the single shot S/S 43 to emit an S/R clock pulse on the S/R Clock line which then proceeds to the AND gate A-0 through A-5 in FIG. 3C to impulse the particular registers which were previously selected by the S/R Mask. As will be remembered, sequences (102), (103) and (104) specify the particular masks to be selected, depending upon the operations required. The next microinstruction of sequence (105B) causes the Counter 46 to be decremented via the CP1 line. At this point input 11 of the IMPX is tested. If the counter has been decremented to zero this line will be set to a "1", indicating that the requisite number of shifts, i.e., n, have occurred, and that sequence (105) is completed, which will allow the system to proceed to sequence (106). If, on the other hand, the counter has not been decremented to zero, line 11 will contain a "0" causing the system to repeat sequence (105B).

Sequence (106) causes line 7 of the IMPX 32 to be interrogated to determine if a "no chain" operation is occurring. If line 7 contains a "0", indicating chaining, the system branches to sequence (108A). If line 7 is set to a "1", indicating no chaining, the system continues to sequence (107A).

Assuming a "no chain" operation has been indicated, sequence (107A) causes the input cable of the Control Latches 42 to select MPX 2 cable 1. The S/R Mask is set to 001000. This causes the C shift line to be activated so that shifting pulses will be applied to the OLD Register. The instruction sequence also causes input line 9 to the IMPX 32 to be selected. Finally, the value n is set into the counter 46 and the U/D line is set to a 1 which causes the counter to be incremented upon receipt of a pulse CP1. What this has done is set up the OLD Register circuitry to allow the completion of an 8 byte shift in the OLD Register, to complete the reloading of the OLD Register (with its former contents) as begun in box 104 of the flow diagram. This way, the constant which is stored in the OLD Register for this mode of operation is in effect completely reloaded into its proper position. By setting the Counter 46 to a value of n and incrementing the counter, a carry will be produced when the Counter reaches a value of 8, as explained in the U.S. Pat. No. 4,078,152.

Clock sequence (107B) is a control loop which allows the registers to be shifted the requisite number of times until a number of shifts equal to 8-n have occurred. The loop 107B first causes a S/R clock pulse to be emitted through the Output Decoder 40 which passes to the AND gate array of FIG. 3C and is ultimatey fed to the OLD Register over line C, to effect a shifting operation. At the same time, the Counter 46 is incremented and then line 9 is automatically interrogated to see if it is set to a "0" or a "1". If it is set to a "0", this indicates that the requisite number of shifts has not yet occurred and the system branches back to the beginning of sequence 107B. If on the other hand a "1" appears, the sequence proceeds to box 108 and enters sequence (108A).

Box 108 performs the function of right-justifying, by 8-n positions, the just-constructed n bytes of ciphertext Y or plaintext X in the OUT Register. This is commenced in sequence (108A) by first causing the S/R mask line emanating from the Control Latches 42 to be set to the value 000010. This causes the E line which effects the shifting operations in the OUT Register to be set up to receive a pulse from the S/R Clock Line in sequence (108B). Since this is merely a shifting operation in one register it is not necessary to select any of the multiplexers 1 through 4. However, since it is necessary to shift 8-n times the sequence causes input line 9 of the Input MPX 32 to be selected and the value n is loaded into the counter 46. At the same time the U/D line is set to a 1 which enables the Counter 46 to be incremented. The system then proceeds to sequence (108B) which is a shifting loop as is (107B), (105B), etc. In this case the S/R clock pulse emanates through the Output Decoder 40 and passes through AND gate A-0 to effect a 1-byte shift operation in the OUT Register. Counter 46 is incremented and the setting of line 9 to the Input MPX 32 is interrogated. If it is a "0" which means that a sufficient number of shifts have not yet occurred to produce a carry on the Counter Carry line, the control returns to the beginning of sequence (108B). If on the other hand, line 9 contains a "1" the system proceeds to sequence (37A) shown in column 25 of U.S. Pat. No. 4,078,152, which causes the n bytes of the short block emanating from the system to be gated out of the OUT Register. Specific operations required in box 37 are similar to those in box 108 with the exception that after the value of n is set into the counter 46, line 11 rather than line 9 is interrogated and the U/D line is set to a "0" which causes the counter to be decremented. For a further description of the operation of this particular box reference is again made to U.S. Pat. No. 4,078,152. Upon termination of box 37, the system returns control to the overall system controls at conector C as exemplified in U.S. Pat. No. 4,078,152.

It will be remembered that OLD Register 12 at this point in time contains a new current chaining value suitable for use by the system regardless of whether the next occurrence in the data stream is an 'end of record', a short block or a full block. Thus as will be appreciated the chaining value currently in OLD Register 12 represents the last eight bytes of cipher text Y produced by the system, if at least 8 bytes have been produced, otherwise it consists of the fewer than 8 ciphertext bytes which have been produced, preceded by enough of the final bytes of the initial chaining value to make up 8 bytes.

This completes the description of the presently disclosed hardware system for performing the disclosed short block chaining method of the present invention. It constitutes a best mode configuration; however, it is to be understood that many modifications and changes are possible within the control flow without specifically departing from the broad concepts that are disclosed herein.

It will further be understood that obvious changes would have to be made depending on different types of record formats other than these disclosed in the parent U.S. Pat. No. 4,078,152, wherein it was assumed that a short block would normally occur only at the end of a record. It is assumed that some symbol other than a regular beginning of record or end of record symbol would be utilized to separate successive short blocks. Appropriate decoder circuitry for recognizing such symbols would be obvious and are not specifically disclosed as they have no bearing on the present invention.

INDUSTRIAL APPLICATIONS

The present invention has primary applicability in the field of cryptography and more particularly in Key-Controlled Block-Cipher Cryptographic Systems of the type specifically required by the Federal Information Processing Standards on Cryptography set forth previously in the specification. It should be understood, however, that the present chaining method could be utilized with any block-cipher cryptographic system wherein it is anticipated that a substantial number of short blocks would be encountered in the data stream to be enciphered.

The invention results in a degree of cryptographic security for short blocks and their successor blocks equal to that for the standard size or full data block lengths. In addition it has the self healing characteristics mentioned above wherein any error due to faulty transmission of a block of data ceases to have deleterious influence after two full-block's-lengths of operation.

The field of cryptography and thus, of the invention, has obvious application in any application where data secrecy is required or desired. The primary area is in the field of data communication over channels that are easily intercepted. Another area where cryptography has great potential utility is in that of the computer storage of large quantities of data upon on, for example, magnetic disks or backup magnetic tapes and the like, wherein the secrecy of the data is very important but wherein it is often difficult to completely secure the physical access to them. The storage of data on such devices in enciphered form greatly enhances their security.

Many other specific applications of the field of cryptography are currently used but they are basically variations of the above two uses. One example of such a use is the encipherment of special identification words and symbols to be used for example with credit cards and the like to be utilized in retail stores and/or banks by persons wishing to obtain cash from unattended cash issuing terminals now in wide usage in many banking institutions. By enciphering certain data on the cards, unauthorized use of the cards is rendered more difficult if not impossible.

While the invention has been particularly shown and described with reference to a preferred embodiment thereof, it will be understood by those skilled in the art that the foregoing and other changes in form and details may be made therein with departing from the spirit and scope of the invention.

Having thus described my invention, what I claim as new, and desire to secure by Letters Patent is:

1. In a key-controlled block-cipher cryptographic process which includes taking an input data block and cryptographically transforming same into an input data block as a function of a unique user supplied key, initially transforming each new full input data block of length $L^{(f)}$ by a mathematically invertible function which depends on a preexisting data word which existed during a previous cryptographic transformation and using said initially transformed data block as the input block to said key-controlled cryptographic transformation, the improvement which comprises utilizing as the preexisting data word the immediately preceding cryptographically transformed output data string of length $L^{(f)}$ resulting from immediately preceding cryptographic transformations regardless of the length of the preceding encrypted data block.

2. A block cipher cryptographic system as set forth in claim 1 including using a predetermined data word as the preexisting data word for initiating operation of the system.

3. A cryptographic process as set forth in claim 1 including detecting that a short block of input data of length $L^{(s)}$ is to be transformed by the cryptographic system, determining said length $L^{(s)}$ of the short block, cryptographically transforming said preexisting data word of length $L^{(f)}$ and utilizing same to produce a short output data block which is a mathematically invertible function of said input short block, said function depending on said cryptographically transformed preexisting data word.

4. A cryptographic method as set forth in claim 1 including detecting that a short data block is to be transformed by the cryptographic system, determining the length $L^{(s)}$ of the short data block, transforming said preexisting data word by said key-controlled cryptographic transformation, selecting a portion of said cryptographically transformed preexisting data word equal in length to said short block, combining the short input block with said selected portion of said cryptographically transformed data word by a mathematically invertible function, outputting the result of said combining step as the output short block of the cryptographic system and utilizing said output short block as the most recent portion of length $L^{(s)}$ of said preexisting data word of length $L^{(f)}$ to be used in the next subsequent cryptographic step.

5. A cryptographic method as set forth in claim 4 including utilizing an exclusive-OR operation as the mathematically invertible function for combining the short data block and the cryptographically transformed preexisting data word.

6. In a block cipher cryptographic system for enciphering blocks of incoming data of a fixed predetermined size $L^{(f)}$ as a function of a unique user supplied encryption key to produce a cryptographically transformed output block of the same size as the input data block, the improvement which comprises a method for cryptographically transforming short data blocks of length $L^{(s)}$ being less than said predetermined block size $L^{(f)}$ to produce an output cryptographically transformed short data block of the same size $L^{(s)}$ as the input data block, said improved method including recognizing when a short input data block of length $L^{(s)}$ is encountered, obtaining the immediately preceding cryptographically transformed output data string from the system of length $L^{(f)}$, cryptographically transforming said output data string of length $L^{(f)}$, extracting a predetermined portion of said cryptographically transformed data string of length $L^{(s)}$ and combining said transformed string and data block of length $L^{(s)}$ in a mathematically invertible function utilizing the output of said combination as the cryptographically transformed short data block, and utilizing the cryptographically transformed data block segment of length $L^{(s)}$ as the most recent portion of said immediately preceding output data string for use in the next encipherment regardless of the length ($L^{(f)}$ or $L^{(s)}$) of the next input data block to be enciphered.

7. In a block cipher cryptographic system for encrypting blocks of incoming data of a fixed predetermined size $L^{(f)}$ as a function of a unique user supplied encryption key to produce a cryptographically transformed output block Y of the same length $L^{(f)}$ as the input data block, a chaining method for cryptographically transforming short data blocks of length $L^{(s)}$ being less than said predetermined block size $L^{(f)}$ to produce an output cryptographically transformed short data block $Y^{(s)}$ of the same length $L^{(s)}$ as the input data block, said improved method including recognizing when a short input data block of length $L^{(s)}$ is encountered, utilizing as the chaining value V for a current encipherment step the last full block's-length $L^{(f)}$ of the system cipher-text output regardless of the length of previous output blocks $Y_i$, cryptographically transforming said chaining value, extracting a predetermined portion of said cryptographically transformed chaining value of length $L^{(s)}$ and combining same with said input short data block in a mathematically invertible function utilizing the output of said combination as the cryptographically transformed short data block, and utilizing the cryptographically transformed data block of length $L^{(s)}$ as the most recent portion of the chaining value V for use in the next encipherment regardless of the length ($L^{(f)}$ or $L^{(s)}$) of the next input data block to be enciphered.

8. A block cipher cryptographic system as set forth in claim 7 wherein said combining step comprises exclusive-ORing the cryptographically transformed current chaining value with the input short data block.

9. A block cipher cryptographic system as set forth in claim 7 wherein said current output data block $Y_i$ is combined with the previous output data to form the chaining value for the next encipherment step wherein $Y_i$ has a length of n bytes and wherein said last combining step comprises discarding the oldest n bytes of the most recent chaining value and replacing same with $Y_i$.

10. A block cipher cryptograhic system as set forth in claim 9 including using a predetermined data word as an initial chaining value for initiating operation of the system.

* * * * *